US011950338B2

(12) United States Patent
Peng

(10) Patent No.: US 11,950,338 B2
(45) Date of Patent: Apr. 2, 2024

(54) PARALLEL SEQUENCED LED LIGHT STRING

(71) Applicant: Semisilicon Technology Corp., New Taipei (TW)

(72) Inventor: Wen-Chi Peng, New Taipei (TW)

(73) Assignee: SEMISILICON TECHNOLOGY CORP., New Taipei (TW)

( * ) Notice: Subject to any disclaimer, the term of this patent is extended or adjusted under 35 U.S.C. 154(b) by 66 days.

(21) Appl. No.: 17/366,257

(22) Filed: Jul. 2, 2021

(65) Prior Publication Data

US 2023/0007750 A1 Jan. 5, 2023

(51) Int. Cl.
*H05B 45/46* (2020.01)
*H05B 45/34* (2020.01)

(52) U.S. Cl.
CPC ............. *H05B 45/46* (2020.01); *H05B 45/34* (2020.01)

(58) Field of Classification Search
CPC ........ H05B 45/34; H05B 45/46; H05B 45/52; H05B 45/10; H05B 45/20; H05B 45/345
See application file for complete search history.

(56) References Cited

U.S. PATENT DOCUMENTS

2012/0262075 A1* 10/2012 Lynch .................... H05B 45/10 315/192
2012/0299492 A1* 11/2012 Egawa .................. H05B 45/10 315/192

FOREIGN PATENT DOCUMENTS

CN 104936342 A 9/2015
CN 204795757 U * 11/2015

* cited by examiner

*Primary Examiner* — Henry Luong
(74) *Attorney, Agent, or Firm* — MUNCY, GEISSLER, OLDS & LOWE, P.C.

(57) ABSTRACT

A parallel sequenced LED light string includes a plurality of LED modules. The LED modules are connected in parallel through a power wire with a plurality of wire resistances. Each of the LED modules includes an impedance component capable of providing an impedance characteristic. The parallel-connected LED modules receive a supply power, and the LED modules respectively get different voltages through the wire resistances and the impedance components from the supply power so as to sequencing the LED modules.

10 Claims, 5 Drawing Sheets

PARALLEL SEQUENCED LED LIGHT STRING

BACKGROUND

Technical Field

The present disclosure relates to an LED light string, and more particularly to a parallel sequenced LED light string.

Description of Related Art

The statements in this section merely provide background information related to the present disclosure and do not necessarily constitute prior art.

Since light-emitting diode (LED) has the advantages of high luminous efficiency, low power consumption, long life span, fast response, high reliability, etc., LEDs have been widely used in lighting fixtures or decorative lighting, such as Christmas tree lighting, lighting effects of sport shoes, etc. by connecting light bars or light strings in series, parallel, or series-parallel.

Take the festive light for example. Basically, a complete LED lamp includes an LED light string having a plurality of LEDs and a drive unit for driving the LEDs. The drive unit is electrically connected to the LED light string, and controls the LEDs by a pixel control manner or a synchronous manner by providing the required power and the control signal having light data to the LEDs, thereby implementing various lighting output effects and changes of the LED lamp.

According to the present technology, in order to drive the LEDs of the LED light string to diversify light emission, the LEDs have different address sequence data. The LEDs receive light signals including light data and address data. If the address sequence data of the LEDs are the same as the address data of the light signals, the LEDs emit light according to the light data of the light signals. If the address sequence data of the LEDs are not the same as the address data of the light signals, the LEDs ignore the light data of the light signals.

At present, most of the LED sequence methods of the LED light string are complicated and/or difficult. For example, before the LEDs are combined into an LED light string, it is necessary to burn different address sequence data for each LED. Afterward, the LEDs are sequentially arranged and combined into the LED light string according to the address sequence data. If the LEDs are not arranged in sequence according to the address sequence data, the diversified light emission of the LEDs cannot be correctly achieved.

SUMMARY

An object of the present disclosure is to provide a parallel sequenced LED light string to solve the problem of using address as the sequence of LEDs.

In order to achieve the above-mentioned object, the parallel sequenced LED light string includes a plurality of LED modules. The plurality of LED modules is connected in parallel through a power wire with a plurality of wire resistances. Each of the LED modules includes an impedance component capable of providing an impedance characteristic. The parallel-connected LED modules receive a supply power, and the LED modules respectively get different voltages through the wire resistances and the impedance components from the supply power so as to sequencing the LED modules.

In one embodiment, the different voltages compare with a plurality of voltage ranges to determine the sequence the LED modules.

In one embodiment, the voltage ranges are built in a look-up table.

In one embodiment, the different voltages are determined according to the supply power, the number of the LED modules, the wire resistances, and the impedance component.

In one embodiment, the supply power is a constant-voltage source. Each of the impedance components is a controllable resistor with an adjustable resistance, and a resistance of the controllable resistor is designed to be decreased.

In one embodiment, a voltage generated by a front LED module is greater than a voltage generated by a rear LED module.

In one embodiment, the supply power is a constant-current source. Each of the impedance components is a controllable resistor with an adjustable resistance, and a resistance of the controllable resistor is designed to be increased.

In one embodiment, a voltage generated by a front LED module is less than a voltage generated by a rear LED module.

In one embodiment, the parallel sequenced LED light string further includes a signal generation unit. The signal generation unit provides a sequence signal. Each of the impedance components is a controllable resistor with an adjustable resistance.

In one embodiment, the sequence of the LED modules is determined according to a cycle of the sequence signal. The supply power is a constant-voltage source; when the sequence of one of the LED modules is completed, the corresponding impedance component is turned off, and the resistances of the remaining impedance components corresponding to the un-sequenced LED modules are decreased.

In one embodiment, the sequence of the LED modules is determined according to a cycle of the sequence signal. The supply power is a constant-current source; when the sequence of one of the LED modules is completed, the corresponding impedance component is turned off, and the resistances of the remaining impedance components corresponding to the un-sequenced LED modules are increased.

In one embodiment, the parallel sequenced LED light string further includes a switch unit. The switch unit is connected to the controllable resistor in series.

In one embodiment, each of the LED modules includes a plurality of resistors and a plurality of switch units. The plurality of switch units is correspondingly connected to the resistors in series.

In one embodiment, the parallel sequenced LED light string further includes a compensation unit. The compensation unit is coupled to the last LED module in parallel. The compensation unit includes a controllable resistor with an adjustable resistance.

In one embodiment, the supply power is a constant-voltage source. When the LED modules are sequentially sequenced, the adjustable resistance of the controllable resistor is sequentially decreased.

In one embodiment, the supply power is a constant-current source. When the LED modules are sequentially sequenced, the adjustable resistance of the controllable resistor is sequentially increased.

Accordingly, the voltage range information provided by the built-in look-up table is used for corresponding the detected voltage, and the voltage difference is provided to determine the sequence of the LED modules, thereby simplifying the circuit design and quickly completing the sequencing of the LED light string, and the controllable resistor with adjustable resistance, the compensation unit with adjustable resistance, or the parallel-connected resistors is/are used to increase the accuracy of comparison, determination, and identification between the detected voltage and the voltage ranges of the look-up table.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawings as follows.

DETAILED DESCRIPTION

Figure 1A:
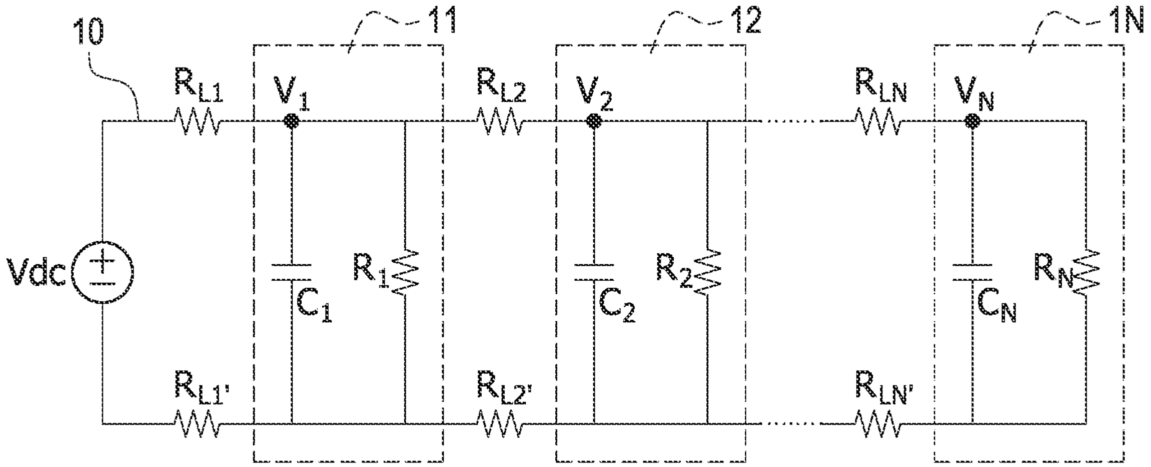
FIG. 1A is a circuit diagram of a parallel sequenced LED light string supplied power by a constant-voltage source according to a first embodiment of the present disclosure.

Reference will now be made to the drawing figures to describe the present disclosure in detail. It will be understood that the drawing figures and exemplified embodiments of present disclosure are not limited to the details thereof.

Please refer to FIG. 1A, which shows a circuit diagram of a parallel sequenced LED light string supplied power by a constant-voltage source according to a first embodiment of the present disclosure. The parallel sequenced LED light string includes a plurality of (N) LED (light-emitting diode) modules 11,12, . . . ,1N. The LED modules 11,12, . . . ,1N are connected in parallel through a power wire 10. In terms of actual conditions, the power wire 10 has a plurality of wire resistances $R_{L1}$,$R_{L2}$, . . . ,$R_{LN}$,$R_{L1'}$,$R_{L2'}$, . . . ,$R_{LN'}$. Each of the LED modules 11,12, . . . ,1N has a resistance $R_1$, $R_2$, . . . ,$R_N$ and a parasitic capacitor $C_1$,$C_2$, . . . ,$C_N$ in parallel with the corresponding resistance $R_1$,$R_2$, . . . ,$R_N$. That is, a first LED module 11 has a first resistance $R_1$ and a first parasitic capacitor $C_1$ connected in parallel, a second LED module 12 has a second resistance $R_2$ and a second parasitic capacitor $C_2$ connected in parallel, . . . , and a Nth LED module 1N has a Nth resistance $R_N$ and a Nth parasitic capacitor $C_N$ connected in parallel.

As shown in FIG. 1A, the parallel-connected LED modules 11,12, . . . ,1N receive a supply power Vdc. In this embodiment, the supply power Vdc is a constant-voltage source for providing a voltage source with a constant voltage value. The LED modules 11,12, . . . ,1N respectively get different voltages through the wire resistances $R_{L1}$, $R_{L2}$, . . . ,$R_{LN}$,$R_{L1'}$,$R_{L2'}$, . . . ,$R_{LN'}$ and the resistances $R_1$, $R_2$, . . . ,$R_N$ of the LED modules 11,12, . . . ,1N from the supply power Vdc.

At the time of power-on, since the circuits in each of the LED modules 11,12, . . . ,1N have not been started or operated, each of the LED modules 11,12, . . . ,1N may be equivalent to the corresponding resistances $R_1$,$R_2$, . . . ,$R_N$. For the convenience of description, the wire resistance $R_{L1}$ and the wire resistance $R_{L1'}$ may be equivalent to the single-wire wire resistance $R_{L1}$. Similarly, the wire resistance $R_{L2}$ and the wire resistance $R_{L2'}$ may be equivalent to the single-wire wire resistance $R_{L2}$, . . . , and the wire resistance $R_{LN}$ and the wire resistance $R_{LN'}$ may be equivalent to the single-wire wire resistance $R_{LN}$.

After the time of power-on, the supply power Vdc supplies power to the LED modules 11,12, . . . ,1N. Due to the voltage difference caused by the current flowing through the wire resistances $R_{L1}$,$R_{L2}$, . . . ,$R_{LN}$, the voltages generated on the LED modules 11,12, . . . ,1N are different. In this embodiment, the voltage difference caused by the power supply Vdc of the constant-voltage source through the wire resistances $R_{L1}$,$R_{L2}$, . . . ,$R_{LN}$ is the voltage drop. Please refer to FIG. 3A, which shows a schematic voltage diagram of the parallel sequenced LED light string according to the first embodiment of the present disclosure. A first voltage $V_1$ on the first LED module 11 is greater than a second voltage $V_2$ on the second LED module 12, the second voltage $V_2$ is greater than a third voltage $V_3$ on the third LED module 13, and the rest may be deduced by analogy. The voltage generated by the front (up-stream) LED module is greater than the voltage generated by the rear (down-stream) LED module, i.e., $V_1 > V_2 > \ldots > V_N$. Accordingly, the LED modules 11,12, . . . ,1N are sequenced according to the different generated voltages $V_1$,$V_2$, . . . ,$V_N$. In the following, the different generated voltages $V_1$,$V_2$, . . . ,$V_N$ and the sequence principle of the LED modules 11,12, . . . ,1N are described.

In one embodiment, it can be implemented by means of a built-in corresponding look-up table. For example, the circuit designer may build the look-up table in advance according to the power supply Vdc, the number of the LED modules 11,12, . . . ,1N, the (estimated) wire resistances $R_{L1}$,$R_{L2}$, . . . ,$R_{LN}$, and the resistances $R_1$,$R_2$, . . . ,$R_N$ for the different generated voltages $V_1$,$V_2$, . . . ,$V_N$, thereby sequencing the LED modules 11,12, . . . ,1N.

The following is an implementation of the look-up table, in which 100 LED modules 11,12, . . . ,1N are taken as an example for description.

| sequence of the LED modules | voltage ranges (volts) |
|---|---|
| #1 | 5.10-4.90 |
| #2 | 4.90-4.70 |
| #3 | 4.70-4.54 |
| #4 | 4.54-4.38 |

-continued

| sequence of the LED modules | voltage ranges (volts) |
|---|---|
| #5 | 4.38-4.26 |
| #6 | 4.26-4.14 |
| . . . | . . . |
| #100 | 2.36-2.32 |

When the LED light string is powered on, the supply power Vdc supplies power to the LED modules 11, 12, . . . ,1N. Therefore, the first voltage $V_1$ is generated on the first LED module 11, the second voltage $V_2$ is generated on the second LED module 12, . . . , and the Nth voltage $V_N$ is generated on the Nth LED module 1N. For example, when the voltage (for example, the first voltage $V_1$) acquired by a certain LED module (for example, the first LED module 11) is 5.00 volts, since the voltage is within the voltage range (5.10-4.90 volts) of the first sequence (#1), the LED module is sequenced as the first LED module 11. Similarly, when the voltage (for example, the second voltage $V_2$) acquired by a certain LED module (for example, the second LED module 12) is 4.80 volts, since the voltage is within the voltage range (4.90-4.70 volts) of the second sequence (#2), the LED module is sequenced as the second LED module 12. Similarly, when the voltage (for example, the sixth voltage $V_6$) acquired by a certain LED module (for example, the sixth LED module 16) is 4.20 volts, since the voltage is within the voltage range (4.26-4.14 volts) of the sixth sequence (#6), the LED module is sequenced as the sixth LED module 16.

Therefore, after the LED light string is powered on, the sequence of each of the LED modules 11,12, . . . ,1N can be acquired according the corresponding voltage ranges in the look-up table by detecting the voltages $V_1,V_2, \ldots ,V_N$ generated by the LED modules 11,12, . . . ,1N. However, the above-mentioned voltage ranges in the look-up table are not limited by the voltage values of the examples, which can be built according to the power supply Vdc, the number of the LED modules 11,12, . . . ,1N, the (estimated) wire resistances $R_{L1},R_{L2}, \ldots ,R_{LN}$, the resistances $R_1,R_2, \ldots ,R_N$, or other parameters.

Figure 1B:
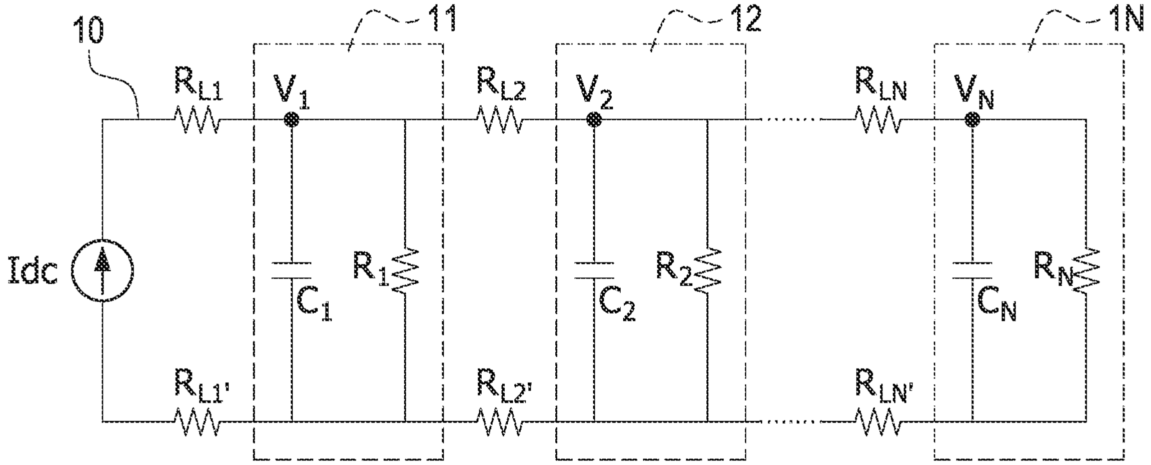
FIG. 1B is a circuit diagram of the parallel sequenced LED light string supplied power by a constant-current source according to the first embodiment of the present disclosure.

Please refer to FIG. 1B, which shows a circuit diagram of the parallel sequenced LED light string supplied power by a constant-current source according to the first embodiment of the present disclosure. In addition to realizing the power supply Vdc by means of the constant-voltage source, the present disclosure may also be realized by means of a constant-current source. In this embodiment, the supply power Idc is a constant-current source for providing a current source with a constant current value. The LED modules 11,12, . . . ,1N respectively get different voltages through the wire resistances $R_{L1},R_{L2}, \ldots ,R_{LN},R_{L1'}, R_{L2'}, \ldots ,R_{LN'}$ and the resistances $R_1,R_2, \ldots ,R_N$ of the LED modules 11,12, . . . ,1N from the supply power Idc.

At the time of power-on, since the circuits in each of the LED modules 11,12, . . . ,1N have not been started or operated, each of the LED modules 11,12, . . . ,1N may be equivalent to the corresponding resistances $R_1,R_2, \ldots ,R_N$. For the convenience of description, the wire resistance $R_{L1}$ and the wire resistance $R_{L1'}$ may be equivalent to the single-wire wire resistance $R_{L1}$. Similarly, the wire resistance $R_{L2}$ and the wire resistance $R_{L2'}$ may be equivalent to the single-wire wire resistance $R_{L2}$, . . . , and the wire resistance $R_{LN}$ and the wire resistance $R_{LN'}$ may be equivalent to the single-wire wire resistance $R_{LN}$.

After the time of power-on, the supply power Idc supplies power to the LED modules 11,12, . . . ,1N. Due to the voltage difference caused by the current flowing through the wire resistances $R_{L1},R_{L2}, \ldots ,R_{LN}$, the voltages generated on the LED modules 11,12, . . . ,1N are different. In this embodiment, the voltage difference caused by the power supply Idc of the constant-current source through the wire resistances $R_{L1},R_{L2}, \ldots ,R_{LN}$ is the voltage rise. Please refer to FIG. 3B, which shows a schematic voltage diagram of the parallel sequenced LED light string according to the second embodiment of the present disclosure. A first voltage $V_1$ on the first LED module 11 is less than a second voltage $V_2$ on the second LED module 12, the second voltage $V_2$ is less than a third voltage $V_3$ on the third LED module 13, and the rest may be deduced by analogy. The voltage generated by the front (up-stream) LED module is less than the voltage generated by the rear (down-stream) LED module, i.e., $V_1<V_2< \ldots <V_N$. Accordingly, the LED modules 11, 12, . . . ,1N are sequenced according to the different generated voltages $V_1,V_2, \ldots ,V_N$. In the following, the different generated voltages $V_1,V_2, \ldots ,V_N$ and the sequence principle of the LED modules 11,12, . . . ,1N are described.

In one embodiment, it can be implemented by means of a built-in corresponding look-up table. For example, the circuit designer may build the look-up table in advance according to the power supply Idc, the number of the LED modules 11,12, . . . ,1N, the (estimated) wire resistances $R_{L1},R_{L2}, \ldots ,R_{LN}$, and the resistances $R_1,R_2, \ldots ,R_N$ for the different generated voltages $V_1,V_2, \ldots ,V_N$, thereby sequencing the LED modules 11,12, . . . ,1N.

The following is an implementation of the look-up table, in which 100 LED modules 11,12, . . . ,1N are taken as an example for description.

| sequence of the LED modules | voltage ranges (volts) |
|---|---|
| #1 | 2.36-2.32 |
| #2 | 2.40-2.36 |
| #3 | 2.46-2.40 |
| #4 | 2.52-2.46 |
| #5 | 2.60-2.52 |
| #6 | 2.68-2.60 |
| . . . | . . . |
| #100 | 5.10-4.90 |

When the LED light string is powered on, the supply power Idc supplies power to the LED modules 11, 12, . . . ,1N. Therefore, the first voltage $V_1$ is generated on the first LED module 11, the second voltage $V_2$ is generated on the second LED module 12, . . . , and the Nth voltage $V_N$ is generated on the Nth LED module 1N. For example, when the voltage (for example, the first voltage $V_1$) acquired by a certain LED module (for example, the first LED module 11) is 2.34 volts, since the voltage is within the voltage range (2.36-2.32 volts) of the first sequence (#1), the LED module is sequenced as the first LED module 11. Similarly, when the voltage (for example, the second voltage $V_2$) acquired by a certain LED module (for example, the second LED module 12) is 2.38 volts, since the voltage is within the voltage range (2.40-2.36 volts) of the second sequence (#2), the LED module is sequenced as the second LED module 12. Similarly, when the voltage (for example, the sixth voltage $V_6$) acquired by a certain LED module (for example, the sixth LED module 16) is 2.64 volts, since the voltage is within the voltage range (2.68-2.60 volts) of the sixth sequence (#6), the LED module is sequenced as the sixth LED module 16.

Therefore, after the LED light string is powered on, the sequence of each of the LED modules 11,12, . . . ,1N can be acquired according the corresponding voltage ranges in the look-up table by detecting the voltages $V_1,V_2, \ldots, V_N$ generated by the LED modules 11,12, . . . ,1N. However, the above-mentioned voltage ranges in the look-up table are not limited by the voltage values of the examples, which can be built according to the power supply Idc, the number of the LED modules 11,12, . . . ,1N, the (estimated) wire resistances $R_{L1},R_{L2}, \ldots, R_{LN}$, the resistances $R_1,R_2, \ldots, R_N$, or other parameters.

Take the first embodiment shown in FIG. 1A (that is, the power supply of the constant-voltage source) as an example. In order to increase the accuracy of comparison, determination, and identification between the detected voltage and the voltage ranges of the look-up table, each of the resistances $R_1,R_2, \ldots, R_N$ in each of the LED modules 11, 12, . . . ,1N is a controllable resistor with an adjustable resistance. When the LED modules 11,12, . . . ,1N are sequenced at the time of power-on, the resistance value of each of the controllable resistors (that is, the resistances $R_1,R_2, \ldots, R_N$) may be designed to be the minimum value so that the current flowing through each of the resistances $R_1,R_2, \ldots, R_N$ is maximized. Therefore, the voltages $V_1$, $V_2, \ldots, V_N$ generated on each of the LED modules 11, 12, . . . ,1N can be maximized, thereby increasing the accuracy of comparison, determination, and identification between the detected voltage and the voltage ranges of the look-up table.

Figure 3A:
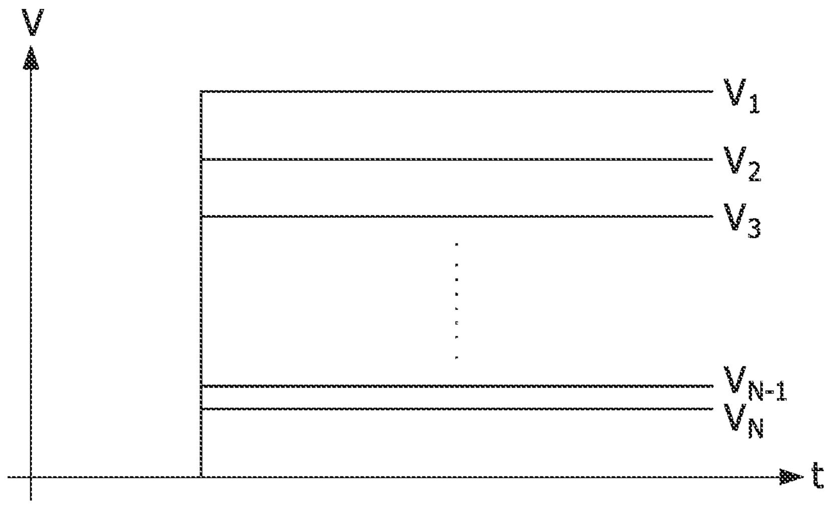
FIG. 3A is a schematic voltage diagram of the parallel sequenced LED light string according to the first embodiment of the present disclosure.
Figure 3B:
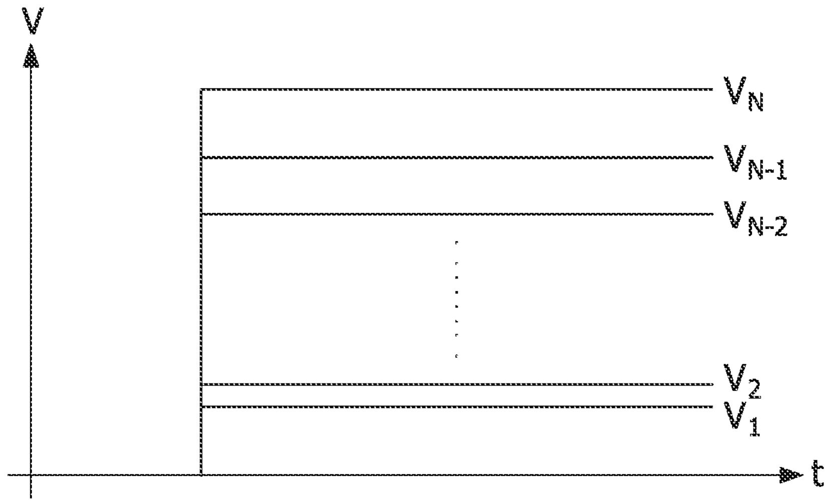
FIG. 3B is a schematic voltage diagram of the parallel sequenced LED light string according to the second embodiment of the present disclosure.

Furthermore, in circuit applications, due to the constant-voltage source of the power supply Vdc and the equivalent resistance effect, the rear (down-stream) current is smaller and a voltage difference between the two rear (down0stream) LED modules is smaller. As shown in FIG. 3A, for example, a voltage difference between the first voltage $V_1$ generated on the first LED module 11 and the second voltage $V_2$ generated on the second LED module 12 is greater than a voltage difference between the second voltage $V_2$ generated on the second LED module 12 and the third voltage $V_3$ generated on the third LED module 13, that is, $V_3-V_2<V_2-V_1$. Moreover, the voltage difference between the LED modules at the rear (down-stream) will be smaller. As also shown in FIG. 1B and FIG. 3B, for the power supply Idc that provides the constant-current source, it is similar to that of the constant-voltage power supply Vdc, but the circuit effect is opposite. Therefore, the operation principle of the power supply Vdc for the constant-voltage source in the following is also applicable to the power supply Idc for the constant-current source, and the detail description is omitted here for conciseness. Only the operation principle of the constant-voltage power supply Vdc is described as follows.

In order to avoid decreasing the accuracy of comparison, determination, and identification between the detected voltage and the voltage ranges of the look-up table due to the lower voltage difference between LED modules, the parallel sequenced LED light string of the present disclosure adjusts the values of the resistances $R_1,R_2, \ldots, R_N$ to maintain the same current so that the voltage difference between any two LED modules is fixed, thereby increasing the accuracy of comparison, determination, and identification between the detected voltage and the voltage ranges of the look-up table. The manner adopted is achieved by adjusting the value of each of the resistances $R_1,R_2, \ldots, R_N$ through a sequence signal. The specific description is as follows.

The sequence signal is a pulse signal, namely, a signal with high and low level interleaving changes, and each high level (or low level) may be used as a basis for the sequence. That is, the first cycle may be regarded as the first sequence, the second cycle may be regarded as the second sequence, and the rest may be deduced by analogy.

Therefore, when the power is turned on for the first time, since the resistances $R_1,R_2, \ldots, R_N$ are connected in parallel, the equivalent resistance value is the smallest so the current flowing through is the largest. The magnitude of the first voltage $V_1$ corresponding to the first sequence (first cycle) of the pulse signal can be acquired.

When the (first time) power-on is finished, the current flowing through the first resistance $R_1$ approaches zero by turning off the first resistance $R_1$ for example, the value of the first resistance $R_1$ is adjusted to a relatively large value, which is like an open circuit for current, or by turning off a switch connected to the first resistance $R_1$ to make the current flowing through the first resistor $R_1$ is zero. In addition, the value of the second resistance $R_2$ of the second LED module 12 to the value of the last resistance of the last LED module (for example, 100th LED module), namely, the 99 remaining resistances are decreased, for example but not limited to 1/100 of the original resistance. Therefore, since the values of the remaining resistances are all decreased, the equivalent resistance values after the parallel connection will be the same so that the current flowing through may be the same. When the power is turned on again, the magnitude of the second voltage $V_2$ corresponding to the second sequence (second cycle) of the pulse signal can be acquired.

Similarly, when the (second time) power-on is finished, the currents flowing through the first resistance $R_1$ and the second resistance $R_2$ approach zero by turning off the first resistance $R_1$ and the second resistance $R_2$, for example, the value of the first resistance $R_1$ and the value of the second resistance $R_2$ are adjusted to relatively large values, which is like an open circuit for current, or by turning off switches connected to the first resistance $R_1$ and the second resistance $R_2$ to make the currents flowing through the first resistor $R_1$ and the second resistance $R_2$ are zero. In addition, the value of the third resistance $R_3$ of the third LED module 13 to the value of the last resistance of the last LED module (for example, 100th LED module), namely, the 98 remaining resistances are decreased, for example but not limited to 1/100 of the original resistance. Therefore, since the values of the remaining resistances are all decreased, the equivalent resistance values after the parallel connection will be the same so that the current flowing through may be the same. When the power is turned on again, the magnitude of the second voltage $V_3$ corresponding to the third sequence (third cycle) of the pulse signal can be acquired. Accordingly, the sequence signal may be used as the basis of the sequence, and the values of the remaining resistances can be adjusted (decreased) to maintain the same current so that the voltage difference between any two LED modules is maintained constant, thereby increasing the accuracy of comparison, determination, and identification between the detected voltage and the voltage ranges of the look-up table.

In comparison with the constant-voltage power supply shown in FIG. 1A, the impedance compensation of the constant-current power supply shown in FIG. 1B is to increase the values of the remaining resistances so that the equivalent resistance values after the parallel connection will increase so that the current flowing through is decreased. Accordingly, the sequence signal may be used as the basis of the sequence, and the values of the remaining resistances can be adjusted (increased) to maintain the same current so that the voltage difference between any two LED modules is maintained constant, thereby increasing the accuracy of comparison, determination, and identification between the detected voltage and the voltage ranges of the look-up table.

Figure 2A:
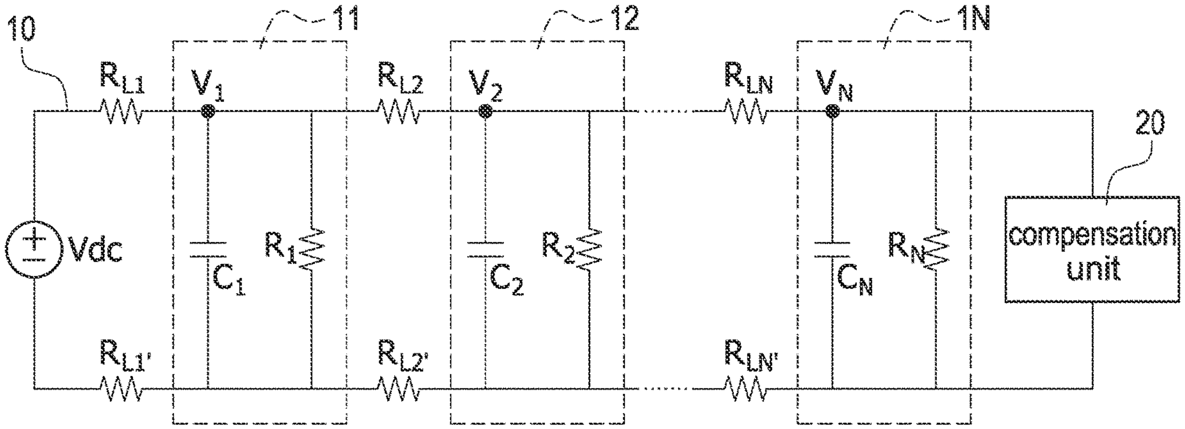
FIG. 2A is a circuit diagram of a parallel sequenced LED light string supplied power by the constant-voltage source according to a second embodiment of the present disclosure.
Figure 2B:
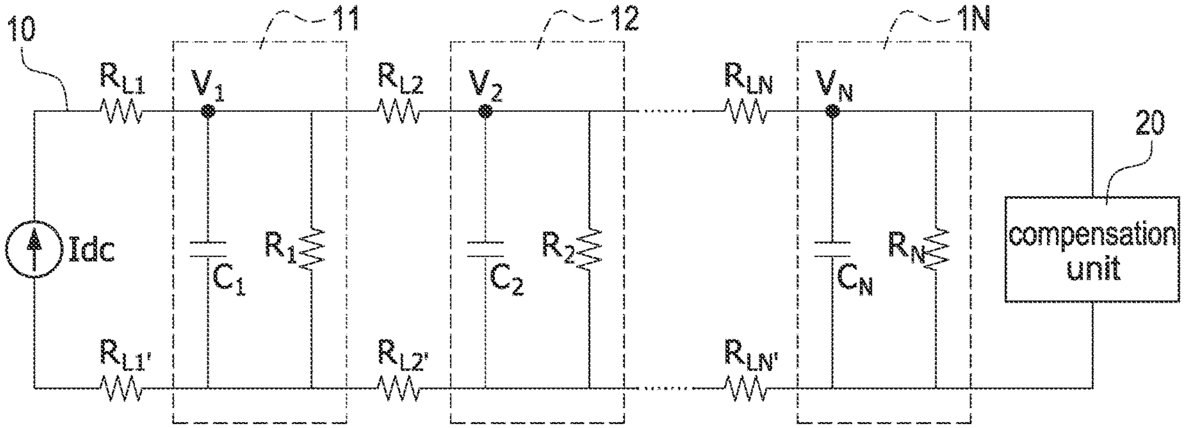
FIG. 2B is a circuit diagram of the parallel sequenced LED light string supplied power by the constant-current source according to the second embodiment of the present disclosure.

Please refer to FIG. 2A and FIG. 2B, which show a circuit diagram of a parallel sequenced LED light string supplied power by the constant-voltage source and by the constant-current source according to a second embodiment of the present disclosure, respectively. For the convenience of description, take the constant-voltage power supply shown in FIG. 2A and FIG. 3A as an example. Therefore, the operation principle of the power supply Vdc for the constant-voltage source in the following is also applicable to the power supply Idc for the constant-current source, and the detail description is omitted here for conciseness. Only the operation principle of the constant-voltage power supply Vdc is described as follows.

The major difference between the LED light string shown in FIG. 2A and the LED light string shown in FIG. 1A is that the resistance value of each LED module 11,12, . . . ,1N in the LED light string of FIG. 2A does not have the controllable characteristics as shown in FIG. 1A. Therefore, In order to achieve the effect of resistance compensation, the LED light string shown in FIG. 2A further includes a compensation unit 20 to replace the controllable adjustment of the resistance in each LED module 11,12, . . . ,1N as shown in FIG. 1A. In other words, the compensation manner with adjustable resistance (that is, the resistance is controllable) shown in FIG. 1A and FIG. 1B will be implemented by the compensation unit 20. Therefore, not only simplify the circuit control, but also save the circuit costs. In particular, the compensation unit 20 is an integrated circuit (IC), which has a counting function, or the compensation unit 20 is a circuit self-designed by an analog circuit and a digital circuit, which has a counting function.

Therefore, when the power is turned on for the first time, since the resistances $R_1,R_2, \ldots ,R_N$ are connected in parallel, the equivalent resistance value is the smallest so the current flowing through is the largest. The magnitude of the first voltage $V_1$ corresponding to the first sequence (first cycle) of the pulse signal can be acquired.

When the (first time) power-on is finished, the first resistance $R_1$ is turned off and the impedance of the compensation unit 20 is decreased (i.e., the impedance compensation of the compensation unit 20 is performed) so that the equivalent resistance values after the parallel connection will be the same and the current flowing through may be the same. When the power is turned on again, the magnitude of the second voltage $V_2$ corresponding to the second sequence (second cycle) of the pulse signal can be acquired.

Similarly, when the (second time) power-on is finished, the first resistance $R_1$ and the second resistance $R_2$ are turned off and the impedance of the compensation unit 20 is further decreased so that the equivalent resistance values after the parallel connection will be the same. In other words, when both the first resistance $R_1$ and the second resistance $R_2$ are turned off, the impedance of the compensation unit 20 is smaller than the impedance when only the first resistance $R_1$ is turned off so that the current flowing through may be the same. When the power is turned on again, the magnitude of the second voltage $V_3$ corresponding to the third sequence (third cycle) of the pulse signal can be acquired. Accordingly, the sequence signal may be used as the basis of the sequence, and the impedance of the compensation unit 20 is adjusted (decreased) to maintain the same current so that the voltage difference between any two LED modules is maintained constant, thereby increasing the accuracy of identifying the detected voltage.

In comparison with the constant-voltage power supply shown in FIG. 2A, the impedance compensation of the constant-current power supply shown in FIG. 2B is to increase the impedance of the compensation unit 20 so that the equivalent resistance values after the parallel connection will increase and the current flowing through is decreased. Accordingly, the sequence signal may be used as the basis of the sequence, and the impedance of the compensation unit 20 is adjusted (increased) to maintain the same current so that the voltage difference between any two LED modules is maintained constant, thereby increasing the accuracy of identifying the detected voltage.

Figure 4:
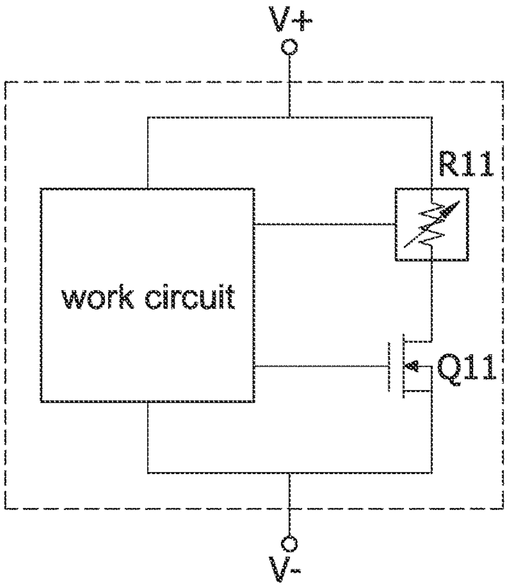
FIG. 4 is a block circuit diagram of a controllable resistor according to the present disclosure.

Please refer to FIG. 4, which shows a block circuit diagram of a controllable resistor according to the present disclosure. As mentioned above, each of the resistances $R_1,R_2, \ldots ,R_N$ in each of the LED modules 11,12, . . . ,1N is a controllable resistor with a controllable resistor R11. The controllable resistor R11 is connected in series to a switch unit Q11, such as but not limited to a transistor switch. Therefore, the resistance value of the controllable resistor R11 may be adjusted to decrease, especially when it is designed to be the minimum value, the current flowing through the control resistors R11 will be maximized. At this condition, the voltages $V_1,V_2, \ldots ,V_N$ generated on each of the LED modules 11,12, . . . ,1N may be maximized, which can increase the accuracy of comparison, determination, and identification between the detected voltage and the voltage ranges of the look-up table.

Figure 5:
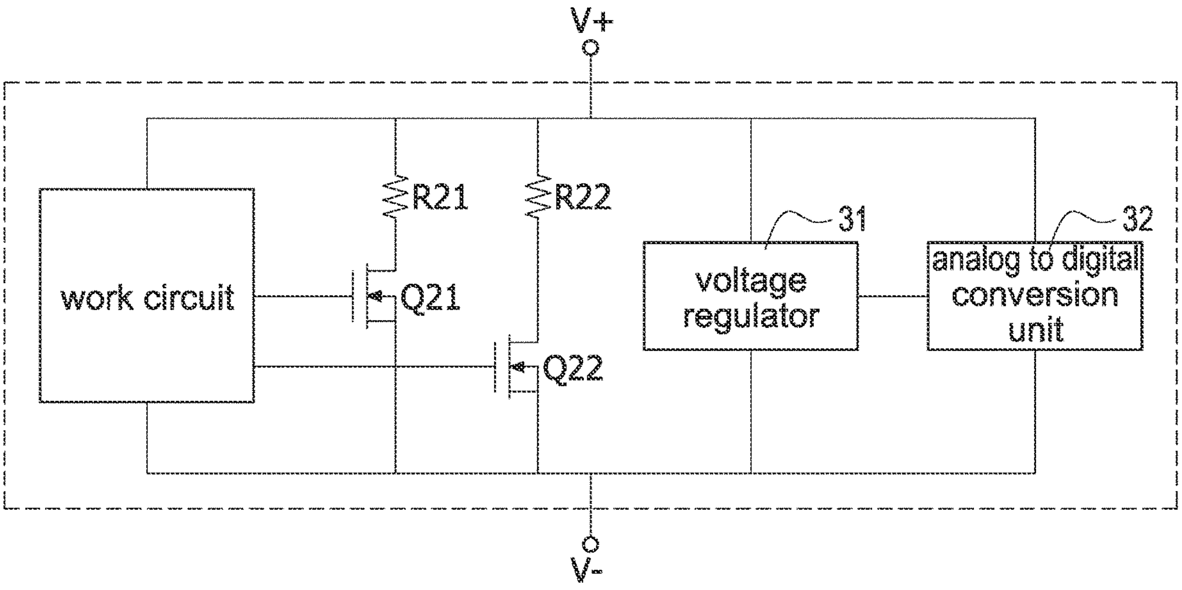
FIG. 5 is a block circuit diagram of multi-resistor embodiment according to the present disclosure.

Please refer to FIG. 5, which shows a block circuit diagram of multi-resistor embodiment according to the present disclosure. In comparison with the controllable resistor with adjustable resistance shown in FIG. 4, the present disclosure may also achieve designs with different resistance values through the way of multiple resistors in parallel, such as two resistors R21,R22. Each of the two resistors R21,R22 are respectively connected to a switch unit Q21,Q22 in series. That is, the resistor R21 is connected to the switch unit Q21 in series, and the resistor R22 is connected to the switch unit Q22 in series. Take two resistors R21,R22 and two switch units Q21,Q22 as an example. In order to generate a smaller resistance value, the switch units Q21,Q22 may be turned on so that the two resistors R21,R22 are connected in parallel. On the contrary, in order to generate a larger resistance value, at least one switch unit Q21,Q22 is turned off, or even both switch units Q21,Q22 are turned off, to become an open-circuited state. Therefore, this embodiment can achieve increasing the accuracy of comparison, determination, and identification between the detected voltage and the voltage ranges of the look-up table. Moreover, a voltage regulator 31 and an analog to digital conversion unit 32 are provided. The voltage regulator 31 is coupled to the resistors R21,R22 and the switch units Q21,Q22 in parallel for voltage regulation. The analog to digital conversion unit 32 is coupled to the voltage regulator 31 for an operation of converting analog signals into digital signals.

Figure 6:
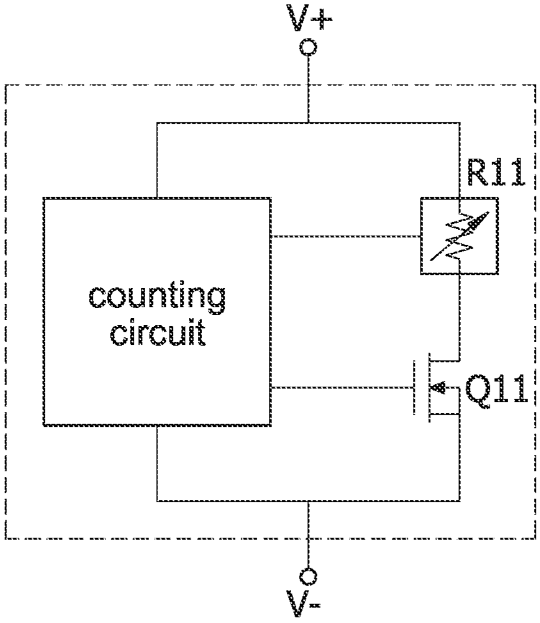
FIG. 6 is a block circuit diagram of counting operation according to the present disclosure.

Please refer to FIG. 6, which shows a block circuit diagram of counting operation according to the present disclosure. It is also a block circuit diagram of the compensation unit to implement a compensation manner with adjustable resistance (that is, controllable resistor).

In summary, the present disclosure has the following features and advantages:

1. The voltage range information provided by the built-in look-up table is used for corresponding the detected voltage, and the voltage difference is provided to determine the sequence of the LED modules, thereby simplifying the circuit design and quickly completing the sequencing of the LED light string.

2. The controllable resistor with adjustable resistance, the compensation unit 20 with adjustable resistance, or the parallel-connected resistors is/are used to increase the accuracy of comparison, determination, and identification between the detected voltage and the voltage ranges of the look-up table.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A parallel sequenced LED light string, comprising:

a plurality of LED modules, connected in parallel through a power wire with a plurality of wire resistances, wherein each of the LED modules comprises a work circuit and an adjustable impedance component, wherein the parallel-connected LED modules receive a constant supply power via the power wire, and the work circuits of the plurality of LED modules respectively detect different voltages through the wire resistances and the adjustable impedance components from the supply power so as to sequence the LED modules, wherein a look-up table is built in each of the work circuits, and the work circuits execute comparison, determination, and identification between detected voltages on the plurality of LED modules and a plurality of voltage ranges of the look-up table to determine the sequence of the LED modules, and wherein the detected voltages on the LED modules are gradually changed.

2. The parallel sequenced LED light string as claimed in claim 1, wherein the constant supply power is a constant-voltage source, wherein each of the impedance components is a controllable resistor with an adjustable resistance, and a resistance of the controllable resistor is designed to be decreased.

3. The parallel sequenced LED light string as claimed in claim 2, wherein a voltage generated by a front LED module is greater than a voltage generated by a rear LED module.

4. The parallel sequenced LED light string as claimed in claim 2, further comprising:

a switch unit connected to the controllable resistor in series.

5. The parallel sequenced LED light string as claimed in claim 1, wherein the constant supply power is a constant-current source, wherein each of the impedance components is a controllable resistor with an adjustable resistance, and a resistance of the controllable resistor is designed to be increased.

6. The parallel sequenced LED light string as claimed in claim 5, wherein a voltage generated by a front LED module is less than a voltage generated by a rear LED module.

7. The parallel sequenced LED light string as claimed in claim 1, wherein each of the adjustable impedance components comprises:

a plurality of resistors, and a plurality of switch units correspondingly connected to the resistors in series.

8. The parallel sequenced LED light string as claimed in claim 1, further comprising:

a compensation unit coupled to the last LED module in parallel, wherein the compensation unit comprises a controllable resistor with an adjustable resistance.

9. The parallel sequenced LED light string as claimed in claim 8, wherein the supply power is a constant-voltage source, when the LED modules are sequentially sequenced, the adjustable resistance of the controllable resistor is sequentially decreased.

10. The parallel sequenced LED light string as claimed in claim 8, wherein the supply power is a constant-current source, when the LED modules are sequentially sequenced, the adjustable resistance of the controllable resistor is sequentially increased.

* * * * *